United States Patent
Timken et al.

(10) Patent No.: US 6,860,986 B2
(45) Date of Patent: Mar. 1, 2005

(54) EXTREMELY LOW ACIDITY ULTRASTABLE Y ZEOLITE CATALYST COMPOSITION AND PROCESS

(75) Inventors: Hye Kyung C. Timken, Albany, CA (US); Lucy Melinda Bull, Pinole, CA (US); Thomas V. Harris, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/290,791

(22) Filed: Nov. 8, 2002

(65) Prior Publication Data

US 2004/0092384 A1 May 13, 2004

(51) Int. Cl.$^7$ .......................... C10G 47/16; B01J 29/08
(52) U.S. Cl. .............. 208/111.01; 208/111.3; 208/111.35; 502/79; 502/64; 502/66; 502/305; 502/313; 502/314; 502/325
(58) Field of Search ............... 208/111.01, 111.3, 208/111.35; 502/79, 64, 66, 305, 313, 314, 325

(56) References Cited

U.S. PATENT DOCUMENTS

| | | | |
|---|---|---|---|
| 3,130,007 A | 4/1964 | Breck | |
| 3,536,605 A | 10/1970 | Kittrell | |
| 3,835,027 A | 9/1974 | Ward | |
| 3,853,747 A | 12/1974 | Young | |
| 3,867,277 A | 2/1975 | Ward | |
| 3,897,327 A | 7/1975 | Ward | |
| 4,239,651 A | 12/1980 | Alafandi et al. | |
| 4,289,653 A | 9/1981 | Jaffe | |
| 4,419,271 A | 12/1983 | Ward | |
| 4,499,197 A | 2/1985 | Seese et al. | |
| 4,661,239 A | 4/1987 | Steigleder | |
| 4,711,868 A | 12/1987 | Shyr et al. | |
| 4,820,402 A | 4/1989 | Partridge et al. | |
| 4,857,170 A | 8/1989 | Hoek et al. | |
| 4,857,171 A | 8/1989 | Hoek et al. | |
| 4,894,142 A | 1/1990 | Steigleder | |
| 4,916,096 A | 4/1990 | Hoek et al. | |
| 4,988,659 A | 1/1991 | Pecoraro | |
| 5,053,374 A | * 10/1991 | Absil et al. ................... 502/64 |
| 5,059,567 A | 10/1991 | Linsten et al. | |
| 5,171,422 A | 12/1992 | Kirker et al. | |
| 5,190,903 A | 3/1993 | Steigleder | |
| 5,342,507 A | 8/1994 | Dai et al. | |
| 5,393,409 A | 2/1995 | Jan et al. | |
| 5,834,572 A | 11/1998 | Derleth et al. | |
| 6,210,563 B1 | 4/2001 | Tsao et al. | |
| 6,267,874 B1 | 7/2001 | Iijima et al. | |
| 6,399,530 B1 | 6/2002 | Chen et al. | |

FOREIGN PATENT DOCUMENTS

| | | |
|---|---|---|
| EP | 0 310 165 B1 | 4/1989 |
| EP | 0 366 207 A1 | 5/1990 |
| EP | 0 671 457 A2 | 9/1995 |
| EP | 0 671 457 A3 | 3/1996 |
| GB | 2 014 970 A | 9/1979 |
| WO | WO 00/40675 | 7/2000 |

\* cited by examiner

Primary Examiner—Walter D. Griffin
(74) Attorney, Agent, or Firm—Steven H. Roth

(57) ABSTRACT

A catalyst composition comprising a low acidity, highly dealuminated ultra stable Y zeolite having an Alpha value of less than about 3 and Broensted acidity measured by FT-IR from about 1 to about 20, preferably from about 1–10, micro mole/g of, an amorphous cracking component and a catalytic amount of hydrogenation component selected from the group consisting of a Group VI metal, a Group VIII metal, and mixtures thereof is disclosed. The present invention provides for a process for converting hydrocarbonaceous oils comprising contacting the hydrocarbonaceous oils with the catalyst under suitable hydrocarbon conversion conditions. Such processes in include, but are not limited to, single stage hydrocracking, two-stage hydrocracking, series-flow hydrocracking, mild hydrocracking, lube hydrocracking, hydrotreating, lube hydrofinishing, hydrodesulphurization, hydrodenitrification, catalytic dewaxing and catalytic cracking.

24 Claims, No Drawings

EXTREMELY LOW ACIDITY ULTRASTABLE Y ZEOLITE CATALYST COMPOSITION AND PROCESS

FIELD OF THE INVENTION

The present invention relates to catalysts and processes using the catalysts for converting hydrocarbonaceous oils to products of an average lower molecular weight and an average lower boiling point.

BACKGROUND OF THE INVENTION

Of the many hydroconversion processes known in the art, hydrocracking is becoming increasingly important since it offers product flexibility together with product quality. Because it is also possible to subject rather heavy feedstocks to hydrocracking, it will be clear that much attention has been devoted to the development of hydrocracking catalysts.

Modern hydrocracking catalysts are generally based on zeolitic materials due to their advantages over earlier refractory oxide based materials such as silica-alumina, magnesia, and alumina. Amorphous catalysts have relatively poor activity but higher selectivity for production of distillate range product while zeolite catalysts provide higher activity but poorer selectivity for distillate, particularly for the heavy-distillate fraction. Among other things, the present invention provides a hydrocracking process with superior overall catalytic performance over amorphous silica-alumina cogel catalyst while maintaining the excellent heavy-distillate selectivity and unconverted oil quality of the amorphous cogel catalyst.

An early synthetic zeolite Y was described in U.S. Pat. No. 3,130,007 issued Apr. 21, 1964, which is incorporated herein by reference. A number of modifications have been reported for this material, one of which is ultrastable Y zeolite as described in U.S. Pat. No. 3,536,605 issued Oct. 27, 1970, which is incorporated herein by reference. Zeolite Y has been constantly improved by techniques like ammonium ion exchange and acid extraction, and various forms of calcination in order to improve the performance of the hydrocracking catalysts.

To further enhance the utility of synthetic Y zeolite and depending upon the hydroprocessing problem sought to be solved, additional components have been added by means known in the art. U.S. Pat. No. 3,835,027 to Ward et al., which is incorporated herein by reference, describes a catalyst containing at least one amorphous refractory oxide, a crystalline zeolitic aluminosilicate and a hydrogenation component selected from the Group VI and VIII metals and their sulfides and oxides. Ward et al. teach that the added materials enhance the catalytic and denitrogenation activity of the catalyst.

U.S. Pat. No. 3,897,327 to Ward, which is incorporated herein by reference, describes a hydrocracking process using a Y zeolite wherein the Y zeolite has a preliminary ammonium ion exchange to replace most of the sodium ion with ammonium ions. This product is then calcined in the presence of at least 0.2 psi of water vapor for a sufficient time to reduce the cell size to a range between 24.40–24.64 Å. The patent teaches that the catalyst has increased hydrothermal stability by maintaining crystallinity and surface area after calcination, exposure to water vapor or water vapor at high temperatures.

In addition to various catalyst compositions, preparation techniques have been discovered to also affect catalytic selectivity. U.S. Pat. No. 3,867,277 to Ward, which is incorporated herein by reference, discloses the use of a Y type zeolite catalyst in a low pressure hydrocracking process. The catalyst described in the patent requires the Y zeolite to be double-exchanged and double-calcined wherein the first calcination step uses a relatively high temperature (950°–1800° F.) and the second calcination step uses relatively low temperatures (750°–1300° F.) to yield a catalyst that is stable in ammonia environments.

U.S. Pat. No. 3,853,747 to Young, which is incorporated herein by reference, teaches that hydrocracking activity of the catalyst is greater when the hydrogenating component is incorporated in the zeolite in such a manner as to avoid impregnation into the inner adsorption area of the zeolite crystallites or particles. For example, the mixing may consist of stirring, mulling, grinding, or any conventional procedure for obtaining an intimate mixture of solid material. The dispersion of the Group VIB metal hydrogenation component is achieved by adding it to the zeolite in a finely divided but essentially undissolved form. The patent teaches that in some cases the soluble molybdenum or tungsten compounds added to the zeolite by impregnation tends to destroy the zeolite crystal structure and acidity during the subsequent drying and calcination steps. Young teaches, however, that the particle size should range from 0.5 microns to 5 microns.

U.S. Pat. No. 4,857,171 to Hoek et al., which is incorporated herein by reference, teaches a process for converting hydrocarbon oils comprising contacting the oil with a catalyst consisting essentially of a Y zeolite having a unit cell size less than 24.40 Å, a silica based amorphous cracking component, a binder and at least one hydrogenation component selected from the group consisting of a Group VI metal, and/or a Group VIII metal and mixtures thereof.

U.S. Pat. No. 4,419,271 to Ward, which is incorporated herein by reference, discloses a composition matter useful as a catalyst base for supporting active hydrogenation metal components or for catalyzing acid catalyzed hydrocarbon conversion reactions comprising in intimate heterogeneous mixture (1) a modified hydrogen crystalline aluminosilicate Y zeolite having activity for catalytically cracking hydrocarbons and having a unit cell size between 24.25–24.35 Å and a water absorption capacity, at 4.6 mm water vapor partial pressure and 25° C., less than 8% by weight of zeolite and (2) a dispersion of silica-alumina in a gamma alumina matrix.

U.S. Pat. No. 4,820,402 to Partridge et al., which is incorporated herein by reference, discloses the use of a highly siliceous large pore zeolite as the acidic component of a catalyst in a process for improved distillate selectivity.

U.S. Pat. No. 5,171,422 to Kirker et al., which is incorporated herein by reference, discloses a process for producing a high quality lube base stock with a USY catalyst with greater than 50:1 silica:alumina ratio.

WO 00/40675, which is incorporated herein by reference, discloses a low pressure hydrocracking process using a catalyst comprising zeolite USY with a framework silica to alumina molar ratio of at least 200:1 preferably greater than 2000:1, and a hydrogenation component.

GB-A-2,014,970 discloses an ultrahydrophobic zeolite Y which has been given a unit cell size dimension of 24.20–24.45 Å by two ammonium exchange steps with an intermediate calcinations step at 550°–800° C. in steam. EP-B-0,028,938 discloses the use of such a modified zeolite for selective conversion of hydrocarbons boiling above 371° C. into midbarrel fuel products having a distillation range of 149°–371° C. Improved manufacturing process for producing 24.25–24.35 Å unit cell size Zeolite Y was disclosed in U.S. Pat. No. 5,059,567 to Linsten et al.

SUMMARY OF THE INVENTION

An embodiment of the present invention is for a process for converting hydrocarbonaceous oils into products of lower average molecular weight and lower average boiling point comprising contacting said hydrocarbonaceous oils under hydrocracking conditions with a catalyst comprising (1) a low acidity, highly dealuminated ultrastable Y zeolite having an Alpha value of less than about 5, preferably less than about 3, and having Broensted acidity measured by FT-IR of from about 1 to about 20, preferably about 1–10 micromole/g, (2) an amorphous cracking component and (3) a catalytic amount of hydrogenation component selected from the group consisting of a Group VI metal, a Group VIII metal, and mixtures thereof.

Another embodiment on the present invention is a process for producing high quality distillate with increased yield of heavy distillate from heavy gas oils comprising contacting a heavy gas oil under hydrocracking conditions with a catalyst comprising a low acidity, highly dealuminated ultrastable Y zeolite having an Alpha value of less than about 5 and Broensted acidity of from about 1 to about 20, preferably about 1–10 micromole/g, an amorphous cracking component and a catalytic amount of hydrogenation component selected from the group consisting of a Group VI metal, a Group VIII metal, and mixtures thereof.

The present invention is also directed to a process for producing high quality lubricating oil base stock from heavy gas oils comprising contacting a feedstock under hydrocracking conditions with a catalyst comprising a low acidity, highly dealuminated ultrastable Y zeolite having an Alpha value of less than about 5 and Broensted acidity of from about 1 to about 20 micromole/g, an amorphous cracking component and a catalytic amount of hydrogenation component selected from the group consisting of a Group VI metal, a Group VIII metal, and mixtures thereof and processing the hydrocracked product to provide a lubricating oil base stock.

Another embodiment of the present invention is a hydrocracking catalyst composition comprising a low acidity, highly dealuminated ultrastable Y zeolite having an Alpha value of less than about 5 and Broensted acidity of from about 1 to about 20, preferably about 1–10 micromole/g, an amorphous cracking component and a catalytic amount of hydrogenation component selected from the group consisting of a Group VI metal, a Group VIII metal, and mixtures thereof.

It has now been found, among other things, that the presence of a low acidity, highly dealuminated ultrastable Y zeolite having an Alpha value of less than about 5 and Broensted acidity of from about 1 to about 20, preferably from about 1–10 micromole/g, together with an amorphous cracking component and a catalytic amount of hydrogenation component selected from the group consisting of a Group VI metal, a Group VIII metal, and mixtures thereof when used in hydrocracking a heavy gas oil results in an unexpected high selectivity to heavy distillate.

DESCRIPTION OF THE PREFERRED EMBODIMENTS

In accordance with the one embodiment of the present invention, the catalyst comprises a low acidity, highly dealuminated ultrastable Y zeolite having an Alpha value of less than about 5 and Broensted acidity of from about 1 to about 20, preferably about 1–10 micromole/g, an amorphous cracking component and a catalytic amount of hydrogenation component selected from the group consisting of a Group VI metal, a Group VIII metal, and mixtures thereof.

The amount of highly dealuminated USY zeolite in the catalyst compositions in accordance with the present invention on a finished catalyst basis including metals ranges from about 1–70% by weight, preferably, from about 1.5–50% and most preferably from about 2–20%.

Highly dealuminated USY zeolites having a silica-to-alumina molar ratio in the bulk composition greater than 50 are useful as the zeolite component of the catalyst compositions according to the present invention. Preference is given to USY zeolites having a silica: alumina molar ratio greater 60, and most preferably having silica: alumina molar ratio greater than 80.

Due to extremely low acidity of these USY, the hydrocracking catalysts of the present invention require the addition of a secondary amorphous cracking component. Consequently, the catalysts of the present invention also include an amorphous cracking component. Preferably, silica-alumina based amorphous cracking components are used. However, other amorphous cracking components that are well known in the art can be used. These include, but are not limited to, magnesia, zirconia, titania, silica, and alumina. Silica-alumina is the preferred amorphous cracking component. The most preferred amorphous cracking component is a silica-alumina composition described in commonly assigned U.S. patent application Ser. No. _____, titled "Highly Homogenous Amorphous Silica-Alumina Catalyst Composition", filed concurrently herewith and incorporated by reference herein. By combining an amorphous cracking component and a low acidity, highly dealuminated ultrastable Y zeolite having an Alpha value of less than about 5 and Broensted acidity of from about 1 to about 20 micromole/g, we were able to produce unique catalysts with desirable product selectivity, activity, and stability.

The amount of amorphous cracking component in the catalyst compositions in accordance with the present invention on a finished catalyst basis including metals, ranges from about 10%–80% by weight, preferably from about 30%–70% by weight and most preferably from about 40%–60%. The amount of silica in the silica-alumina ranges from about 10%–70% by weight. Preferably, the amount of silica in the silica-alumina ranges from about 20%–60% by weight, and most preferably the amount of silica in the silica-alumina ranges from about 25%–50% by weight.

The binder(s) present in the catalyst compositions suitably comprise inorganic oxides. Both amorphous and crystalline binders can be applied. Examples of suitable binders comprise silica, alumina, clays and zirconia. Preference is given to the use of alumina as binder. The amount of binder in the catalyst compositions in accordance with the present invention on a finished catalyst basis including metals ranges 10%–30% by weight, and is preferably from about 15%–25% by weight.

The catalysts of the present invention also comprise a hydrogenation component. As used herein the hydrogenation component mainly means metals of Group VI and VIII in the Periodic Table, for example, chromium, molybdenum, tungsten, iron, cobalt, nickel, platinum, palladium, and the like metals and oxides and sulfides of these metals. These metals may be used in combination of two or more members, for example, combination of metals such as nickel-tungsten, nickel-molybdenum, cobalt-molybdenum, platinum-palladium, and the like.

The amount(s) of hydrogenation component(s) in the catalyst compositions suitably range from about 0.2% to about 10% by weight of Group VIII metal component(s) and from about 5% to about 30% by weight of Group VI metal component(s), calculated as metal(s) per 100 parts by weight of total catalyst. The hydrogenation components in the catalyst compositions may be in the oxidic and/or the sulphidic form. If a combination of at least a Group VI and a Group VIII metal component is present as (mixed) oxides, it will be subjected to a sulphiding treatment prior to proper use in hydrocracking.

Preferred catalyst compositions in accordance with the present invention comprise from about 1%–10% by weight of nickel and from about 5%–40% by weight tungsten. Preferably, the catalyst compositions in accordance with the present invention comprise from about 2%–8% by weight of nickel and from about 8%–30% by weight tungsten, calculated as metals per 100 parts by weight of total catalyst.

It has been found that excellent and unexpected results in terms of performance and activity are obtained using catalysts according to the present invention. Some of these results include: the catalysts of the invention are particularly good for producing more heavy-distillate with 550°–700° F. boiling point range (over 70 cetane); catalysts of the invention show comparable or lower gas-make than a reference catalyst; and catalysts of the invention produce less naphtha during the hydrocracking process by suppressing undesirable overcracking reactions.

In addition, the present invention provides for a process for converting hydrocarbonaceous oils into products of lower average molecular weight and lower average boiling point comprising contacting said hydrocarbonaceous oils under hydrocracking conditions with a catalyst comprising a low acidity, highly dealuminated ultrastable Y zeolite having an Alpha value of less than about 5 and Broensted acidity measured by FT-IR of from about 1 to about 20 micromole/g, an amorphous cracking component and a catalytic amount of hydrogenation component selected from the group consisting of a Group VI metal, a Group VIII metal, and mixtures thereof.

Hydroconversion process configurations in accordance with the present invention are those wherein a substantial reduction in average molecular weight and boiling point can be accomplished by contacting the feed with a catalyst composition comprising a low acidity, highly dealuminated ultrastable Y zeolite having an Alpha value of less than about 5 and Broensted acidity of from about 1 to about 20 micromole/g, an amorphous cracking component and a catalytic amount of hydrogenation component selected from the group consisting of a Group VI metal, a Group VIII metal, and mixtures thereof.

Examples of such hydrocarbon conversion processes in which the catalysts of the present invention may be used are well known in the art and include, but are not limited to, single-stage hydrocracking, two-stage hydrocracking, series-flow hydrocracking, mild hydrocracking, lube hydrocracking, hydrotreating, lube hydrofinishing, hydrodesulphurization, hydrodenitrification, catalytic dewaxing and catalytic cracking.

Feedstocks which can be suitably employed in the process according to the present invention comprise gas oils, vacuum gas oils, deasphalted oils, long residues, catalytically cracked cycle oils, coker gas oils and other thermally cracked gas oils and syncrudes, optionally originating from tar sands, shale oils, waxy hydrocarbons from Fischer-Tropsch hydrocarbon synthesis process, residue upgrading processes or biomass. Combinations of various feedstocks can also be employed.

It may be desirable to subject part or all of the feedstock to one or more (hydro) treatment steps prior to its use in the hydrocarbon conversion process according to the present invention. It is often found convenient to subject the feedstock to a (partial) hydrotreatment. When rather heavy feedstocks are to be processed it will be advantageous to subject such feedstocks to a (hydro) demetallization treatment.

Suitable hydrocracking conditions to be applied comprise temperatures ranging from about 250° C. to about 500° C., pressures up to about 300 bar and space velocities from about 0.1 to about 10 kg feed per liter of catalyst per hour (kg/l/h). Hydrogen gas to feed ratios range from about 100 to about 5000 Nl/kg feed (normal liters at standard temperature and pressure per kilogram) can suitably be used.

Preferably, hydrocracking conditions to be applied comprise temperatures ranging from about 300° C. to about 450° C., pressures from about 25 bar to about 200 bar and space velocities from about 0.2 to about 10 kg feed per liter of catalyst per hour (kg/l/h). Hydrogen gas to feed ratios preferably range from about 250 to about 2000 Nl/kg are applied.

The present invention is also directed to a process for producing high quality distillate and a feedstock for a lubricating oil base stock in increased yields from heavy gas oils. The process includes a hydrocracking step employing a catalyst composition comprising a severely dealuminated and stabilized Y zeolite component according to the invention, a silica-alumina amorphous cracking component, and a hydrogenation component.

A catalyst according to the present invention is particularly good for increasing the yield of a heavy-distillate fraction with 550°–700° F. boiling point range. The hydrocracked heavy-distillate fraction from vacuum gas oil typically exhibits very high Cetane Numbers of 60–80, while a light-distillate fraction with 250°–550° F. boiling point range exhibits Cetane Numbers of 40–55. In order to achieve high a Cetane Number for the combined diesel fuel, it is desirable to increase the heavy-distillate yield in the combined distillate pool. The unconverted 700° F. fraction from our invention exhibits high viscosity index indicating high quality lubricating oil base stock can be produced.

Use of powder X-ray diffraction (XRD) for characterization of USY is well known per ASTM method D 3942–80. The unit cell size of the USY is inversely correlated with the Al content in the USY. As USY become more dealuminated, the unit cell size of USY is changing from 24.70 Å to 24.54 Å or below. However, for severely dealuminated and ultrastabilized USY with bulk $SiO_2/Al_2O_3$ ratio of over 50, the cracking activity of USY could not be differentiated with the XRD unit cell size. Instead, FT-IR, and Alpha test (a model compound test for activity measurement) were used to analyze the activity of USY samples. Standard analysis tests such as bulk composition analysis by ICP and surface area measurements were used to ensure the quality of USY samples.

Transmission IR spectroscopy was used to compare the acidity of USY samples per published methods elsewhere (T. R. Hughes, H. M. White, J. Phys. Chem., 71, 2192,1967; M. A. Makarova, A. Garforth, V. L. Zholobenko, J. Dwyer, G. J. Earl, D. Rawlence, Studies in Surface Science and Catalysis, 84, 365, 1994). Two methods were employed: (1) measurement of the acidic OH stretching bands in the 3600 $cm^{-1}$ region of the spectrum; and (2) adsorption of pyridine to determine the Broensted to Lewis acid site concentrations. Self-supporting wafers weighing about 10 mg were dehydrated in-situ by heating in flowing heat 5° C./min to 400° C. and left at this temperature for 1 hour. The wafers were then cooled to 150° C. and the IR spectrum was recorded. This spectrum was fitted to obtain the intensities of the OH bands for the different acidic sites. Pyridine was also used to measure acidity. Once the samples were dehydrated according to the above method, the IR cell was isolated and then 4 uL (microliter) of pyridine was injected. The pyridine was allowed to adsorb for 1 hour and then the cell was reopened to flowing He to allow desorption of the physically adsorbed pyridine. Typically, desorption was allowed for 12–17 hours, then FT-IR spectra were obtained for the USY sample containing residual chemisorbed pyridine. These spectra were then fitted in the pyridine ring vibration and OH stretching regions to obtain the peak areas as a function of desorption time. The final peak areas were obtained by extrapolating to infinite desorption time.

It is plausible, other Broensted acidity measurement techniques such as solid-sate NMR and temperature programmed desorption with a base (e.g., $NH_3$ TPAD) could also be used, instead of FT-IR, to select the optimum range.

The cracking activity of USY was determined by the Alpha test which was adapted from the published descriptions of the Mobil Alpha test (P. B. Weisz and J. N. Miale, J. Catal., 4, 527–529, 1965; J. N. Miale, N. Y. Chen, and P. B. Weisz, J. Catal., 6, 278–87, 1966). The "Alpha Value" is calculated as the cracking rate of the sample in question divided by the cracking rate of a standard silica alumina sample. The resulting "Alpha" is a measure of acid cracking activity which generally correlates with number of acid sites. Other model compound testing with paraffinic hydrocarbons could also be used to select the optimum range of USY acidity.

The following Examples are illustrative of the present invention, but are not intended to limit the invention in any way beyond what is contained in the claims which follow.

EXAMPLES

Examples 1 through 4

Comparison of USY Zeolite

Four USY zeolites were used for catalyst preparations. Properties of the USY zeolites are summarized as follows:

TABLE 1

USY Properties

| | USY #1 Example 1 Non-invention | USY #2 Example 2 Invention | USY #3 Example 3 Invention | USY #4 Example 4 Invention |
|---|---|---|---|---|
| $SiO_2/Al_2O_3$ molar ratio (bulk) | 94 | 92 | 92 | 88 |
| $Na_2O$, wt % | <0.05 | <0.05 | 0.14 | <0.05 |
| Surface area, $m^2/g$ | 772 | 652 | 712 | 686 |
| Micropore pore volume, cc/g | 0.21 | 0.20 | 0.20 | 0.25 |
| Total pore volume, cc/g | 0.51 | 0.50 | 0.54 | 0.51 |
| Unit cell size, Å | 24.23 | 24.23 | 24.25 | 24.24 |
| % Crystallinity | — | 80 | 106 | — |
| Alpha | 9.1 | 1.0 | 2.4 | 1.1 |
| Broensted acidity by FT-IR, (μmole/g) | 80 | 3 | 8 | 9 |

All four USY zeolites are highly dealuminated and the bulk $SiO_2/Al_2O_3$ ratio of over 80. The unit cell size measured by powder X-ray diffraction cannot differentiate these USY samples, all show the unit cell size of 24.25 Å or less.

We found that Broensted acidity measurement by FT-IR and a model compound cracking testing using n-hexane can differentiate the USY samples. Desirable USY for distillate selective hydrocracking shows Alpha values of less than 5, and Broensted acidity of 1–20 micromole/g measured by FT-IR. Hydrocracking catalysts comprising this type of USY show significantly superior distillate selectivity over a catalyst made with USY with greater than 5 Alpha and greater than 40 micromole/g of Broensted acidity.

Example 5

Preparation of NiW USY Hydrocracking Catalyst (Catalyst A—Base-Case)

A base-case hydrocracking catalyst containing the USY #1 from Table 1 was prepared per following procedure. 10 parts USY, 70 parts silica-alumina powder (Siral-40, obtained from SasolCondea) and 20 parts pseudoboehmite alumina powder were mixed well. To the mix, diluted $HNO_3$ acid and sufficient amount of deionized water were added to form an extrudable paste (3 wt % $HNO_3$ to the total powders). These weights are on 100% solids basis. The paste was extruded in 1/16" cylinder, and dried at 250° F. overnight. The dried extrudates were calcined at 1100° F. for 1 hour with purging excess dry air, and cooled down to room temperature.

Impregnation of Ni and W was done using a solution containing ammonium metatungstate and nickel nitrate to the target metal loadings of 4 wt % NiO and 28 wt % $WO_3$ in the finished catalyst. The total volume of the solution matched the 100% water pore volume of the base extrudate sample (incipient wetness method). The metal solution was added to the base extrudates gradually while tumbling the extrudates. When the solution addition was complete, the soaked extrudates were aged for 2 hours. Then the extrudates were dried at 250° F. overnight. The dried extrudates were calcined at 935° F. for 1 hour with purging excess dry air, and cooled down to room temperature. This catalyst is named Catalyst A and its physical properties are summarized in Table 3.

Example 6

Preparation of NiW Hydrocracking Catalysts with Various USY Samples (Catalysts B, C, E and F)

Catalyst B, a NiW catalyst useful for this invention containing USY #2, was prepared using a procedure similar to Catalyst A. For Catalyst B, 10 parts USY #2 from Table 1, 65 parts silica-alumina powder and 25 parts pseudoboehmite alumina powder were used to prepare the base extrudates. Other than the USY source, other ingredients were identical to the Catalyst A. Then Ni and W were loaded via impregnation as described in the Example 5. The target metal loadings were 4 wt % NiO and 28 wt % $WO_3$. Physical properties of Catalyst B are summarized in Table 3.

Catalyst C, a NiW catalyst useful for this invention containing USY #3, was prepared using a procedure nearly identical to Catalyst B. For Catalyst C, USY #3 was used to prepare the base extrudates. Physical properties of Catalyst B and C are summarized in Table 3. Physical properties of Catalyst C are summarized in Table 3.

Catalyst E, a NiW catalyst useful for this invention containing USY #4, was prepared using a procedure similar to Catalyst A. For Catalyst E, 20 parts USY #4, 60 parts silica-alumina powder and 20 parts pseudoboehmite alumina powder were used to prepare the base extrudates. Other than the USY source, other ingredients were identical to the Catalyst A. Then Ni and W were loaded via impregnation as described in the Example 5. Physical properties of Catalyst E are summarized in Table 4.

Catalyst F, a NiW catalyst useful for this invention containing USY #4, was prepared using a similar procedure. For Catalyst F, 6 parts USY #4, 69 parts silica-alumina powder and 25 parts pseudoboehmite alumina powder were used to prepare the base extrudates. Compared to Catalyst A–C, Catalyst F was made with different silica-alumina which contains 25 wt % $Al_2O_3$. Then Ni and W were loaded via impregnation as described in the Example 5. Physical properties of Catalyst F are summarized in Table 4.

Feedstock for Catalyst Performance Evaluation

A petroleum feedstock with the following properties was used to evaluate the catalysts.

TABLE 2

| Feedstock Properties | |
|---|---|
| Properties | |
| API Gravity | 33.7 |
| Sulfur, ppm wt | 7 |
| Nitrogen, ppm wt | 0.7 |
| D2887 Simulated Distillation | |
| IBP | 645° F. |
| 10 wt % | 707° F. |
| 30 wt % | 769° F. |
| 50 wt % | 826° F. |

TABLE 2-continued

| Feedstock Properties | |
|---|---|
| 70 wt % | 890° F. |
| 90 wt % | 977° F. |
| End Point | 1079° F. |

Example 7

Comparison of Catalyst Performance (Catalyst A vs. B and C)

Catalysts of the present invention (Catalysts B and C) were compared in a single-pass micro unit with a reference catalyst, Catalyst A. Catalyst A was prepared with a USY outside of our invention (USY #1). Catalysts B and C were prepared with highly dealuminated USY #2 and #3, respectively.

Micro unit evaluation of catalysts was done in a once-through, down-flow micro unit with 6 cc of 24/40 (US) meshed catalyst. Process conditions were approximately 2000 psig reactor pressure, a feed rate of 1.5 hour$^{-1}$ LHSV and once-though $H_2$ flow rate corresponding 5000 SCF of $H_2$/bbl of oil. The catalyst bed temperature was varied to cover 60–80 wt % of conversion of the 700° F.$^+$ feed to 700° F.$^-$ product. The yields of $C_4^-$ gas, naphtha, light and heavy-distillate components were calculated using D2887 Simdis analysis results. The overall yields and reactor temperature data were interpolated to 70 wt % conversion and summarized in Table 3.

TABLE 3

Physical Properties and Performance of Catalysts

| | Catalyst A Non-Invention | Catalyst B Invention | Catalyst C Invention |
|---|---|---|---|
| Composition (before metals addition) | | | |
| USY | 10% | 10% | 10% |
| | USY #1 | USY #2 | USY #3 |
| Silica-Alumina | 70% | 65% | 65% |
| $Al_2O_3$ Binder | 20% | 25% | 25% |
| Properties after Metals Addition | | | |
| Ni, wt % | 3.2 | 3.1 | 3.1 |
| W, wt % | 21.0 | 20.2 | 20.6 |
| Surface area, m²/g | — | 256 | 260 |
| Catalyst Performance in Single-Pass Micro Unit | | | |
| Activity, ° F. for 70% Conv. of 700° F.+ | 661 | 716 | 690 |
| No-Loss Yields @ 70% Conv., wt % | | | |
| $C_4^-$ Gas | 3.1 | 3.1 | 2.7 |
| Naphtha (C5 - 250° F.) | 16.0 | 13.1 | 13.4 |
| Light-distillate (250–550° F.) | 40.4 | 39.2 | 40.7 |
| Heavy-distillate (550–700° F.) | 14.5 | 18.8 | 17.3 |
| Total Distillate (250–700° F.) | 55.0 | 58.0 | 58.0 |
| Sum of converted product, wt % | 74.0 | 74.1 | 74.1 |

Catalysts of the present invention (Catalysts B and C) required higher reactor temperatures to obtain the target conversion of 70 wt % due to the lower activity of the USY zeolite samples used to make the catalysts. Even though the reactor temperatures were higher, the catalysts of the invention have significant advantage in distillate production which is quite unexpected. Compared to Catalyst A (the base case), the catalysts of the invention produce less naphtha during the hydrocracking process by suppressing undesirable overcracking reactions. Catalysts of the invention show comparable or lower gas-make than the base case catalyst. Relative to the base case, Catalysts B and C exhibited 3 wt % higher distillate yield, and approximately 3 wt % less naphtha yield.

The catalysts of the invention are particularly good for producing more heavy-distillate with 550°–700° F. boiling point range (over 70 cetane). The catalyst of the invention shows 3–4% advantage in the heavy-distillate yield. Since the cetane number of this fraction is much higher than that of the light-distillate with 250°–550° F. boiling point range (around 50 cetane), the combined distillate fraction will have much higher blending cetane.

Example 8

Comparison of Catalyst Performance for Distillate Production (Cogel Catalyst vs. Catalysts E and F)

Catalysts of the invention (Catalysts E and F) were compared with Catalyst D, which is the state-of-the-art cogel catalyst for a hydrocracking process in a recycle pilot unit.

Recycling pilot unit evaluations were done with 130 cc of extrudate catalyst by recycling unconverted 700° F.$^+$ bottoms and $H_2$ gas. Fresh feed was added to the recycled feed and the feed rate was adjusted to maintain 60 vol % pre-pass conversions. Fresh make-up $H_2$ gas was added to the recycled $H_2$ gas stream to maintain 5000 SCF/bbl of recycled gas flow. Process conditions were:

| Pressure: | 2300 psig total reactor pressure |
| LHSV: | 1.0 hour$^{-1}$ |
| Recycle $H_2$: | 5000 SCF/bbl |

The yields of $C_4^-$ gas, naphtha, light- and heavy-distillate components were calculated using D2887 Simdis analysis results. The overall yields and reactor temperature data were summarized in Table 4.

TABLE 4

Physical Properties and Performance of Catalysts for Distillate Production

| | Catalyst D State-of-the Art Cogel Catalyst Non-Invention | Catalyst E Invention | Catalyst F Invention |
|---|---|---|---|
| Composition (before metals addition) | | | |
| USY | No USY | 20% USY #4 | 6% USY #4 |
| Silica-Alumina | — | 60% | 69% |
| $Al_2O_3$ Binder | — | 20% | 25% |
| Properties after Metals Addition | | | |
| Ni, wt % | 7.7 | 3.1 | 3.1 |
| W, wt % | 18.2 | 21.0 | 20.8 |
| Surface area, m$^2$/g | 289 | 284 | 240 |
| Catalyst Performance in Recycle Pilot Unit | | | |
| Activity, ° F., Catalyst Average Temp. | 681 | 682 | 689 |
| No-Loss Yields | | | |
| $C_4-$ Gas, wt % | 4.8 | 3.2 | 3.8 |
| Naphtha ($C_5$ - 250° F.), vol % | 20.9 | 21.9 | 21.4 |
| Light-Distillate (250–550° F.), vol % | 50.4 | 58.8 | 54.0 |
| Heavy-Distillate (550–700° F.), vol % | 35.8 | 28.8 | 33.0 |
| Total Distillate (250–700° F.), vol % | 86.5 | 87.6 | 87.0 |
| Product Properties of Light-Distillate | | | |
| Smoke Point, mm | 40 | 45 | 40 |
| Freeze Point, ° C. | -61 | -59 | -60 |
| Cetane Number | 51.5 | — | 53 |
| Product Properties of Heavy-Distillate | | | |
| Cetane Number | 71 | 77 | 73 |
| Catalyst Deactivation via Accelerated Fouling Test (Activity loss in ° F./ 1000 hour) | 36 | — | 9 |

Catalysts of the invention (Catalysts E and F) show performance exceeding that of the state-of-the-art cogel catalyst (Catalyst D). Catalysts of the invention show an advantage in that Catalysts E and F make substantially less, undesirable light gas and produce more distillate fraction. The light and heavy-distillate yields can be adjusted by adjusting the USY content in the catalyst. With Catalyst F, we were able to produce the heavy-distillate yield comparable to that of Catalyst D, the state-of-the-art cogel catalyst reference.

The overall product properties with the catalysts of the invention are comparable or better than those of the cogel catalyst. The catalyst of the invention produces distillate with improved Cetane Numbers. Other properties of the distillate products such as the Smoke Point, Freeze Point, and Cloud Point were comparable.

The stabilities of the catalysts were compared in a single-pass micro unit at accelerated fouling conditions (50% increase of oil flow rate and 25% reduction in reactor pressure). The stability data were calculated using the reactor temperature change required to maintain a 70% conversion per 1000 hours of stream time. The catalyst of our invention shows superior aging characteristics in that it deactivated only at ¼ the rate of the cogel catalyst.

To summarize, catalysts according the invention produced improved quality distillate products in high yields while having advantages of zeolite containing hydrocracking catalysts.

Example 9

Comparison of Catalyst Performance for Unconverted Oil (Bottoms) Properties for Lubricating Oil Production (Cogel Catalyst vs. and Catalyst F)

The per-pass conversion of the recycle pilot unit evaluation in Example 8 was changed to 40 vol %, and 40 vol % of the unconverted oil (700° F.+ fraction) was drained. Then product properties were evaluated to examine the potential of this process for lubricating oil production.

TABLE 5

Performance of Catalysts for Lube Production

|  | Catalyst D State-of-the Art Cogel Catalyst Non-Invention | Catalyst F Invention |
|---|---|---|
| Unconverted Oil (700° F.+). As-Produced |  |  |
| API Gravity at 60/60 | 37.4 | 36.8 |
| Viscosity Index | 136 | 142 |
| Solvent Dewaxed Oil |  |  |
| Viscosity Index | 131 | 134 |

The Viscosity Index (waxy VI) of the unconverted oil from the catalyst of our invention showed substantially higher value that that from the cogel catalyst. It was completely unexpected that the zeolite containing hydrocracking catalyst produced 700° F.+ bottoms with higher waxy VI than the amorphous catalyst. The fractions were subjected to MEK/toluene dewaxing step to provide the finished lubricating oil base stock products. The improved VI with our catalyst was maintained after the solvent dewaxing.

While this example used the solvent dewaxing step to produce the finished lubricating oil base stock, it is preferable to perform catalytic dewaxing to generate high quality lube base stock.

There are numerous variations on the present invention which are possible in light of the teachings and supporting examples described herein. It is therefore understood that within the scope of the following claims, the invention may be practiced otherwise than as specifically described or exemplified herein.

What is claimed is:

1. A process for converting hydrocarbonaceous oils into products of lower average molecular weight and lower average boiling point comprising contacting said hydrocarbonaceous oils under hydrocracking conditions with a catalyst comprising a low acidity, highly dealuminated ultrastable Y zeolite having an Alpha value of less than about 5 and Broensted acidity of from about 1 to about 20 micromole/g measured by FT-IR, an amorphous cracking component and a catalytic amount of hydrogenation component selected from the group consisting of a Group VI metal, a Group VIII metal, and mixtures thereof.

2. A process according to claim 1, wherein the ultrastable Y zeolite has a unit cell size less than or equal to 24.26 Å.

3. A process according to claim 1, wherein the ultrastable Y zeolite has a bulk silica to alumina ratio of greater than 50.

4. A process according to claim 1, wherein the catalyst comprises from about 1% to 70% by weight of ultrastable Y zeolite, from about 10% to 80% by weight of amorphous cracking component, and from about 10% to 30% by weight of a binder.

5. A process according to claim 4, wherein the amorphous cracking component is silica-alumina.

6. A process according to claim 4, wherein the binder comprises an inorganic oxide.

7. A process according to claim 1, wherein the Group VIII metal hydrogenation component is selected from the group consisting of nickel, cobalt, platinum, palladium and mixtures thereof and wherein the Group VI metal hydrogenation component is selected from the group consisting of molybdenum, tungsten and mixtures thereof.

8. A process according to claim 1, wherein the hydrogenation component comprises from about 2% to about 8% by weight of nickel and from about 8% to about 30% by weight of tungsten, calculated as meals per 100 parts by weight of total catalyst.

9. A process for producing high quality distillate with increased yield of heavy distillate from heavy gas oils comprising contacting a heavy gas oil under hydrocracking conditions with a catalyst comprising a low acidity, highly dealuminated ultrastable Y zeolite having an Alpha value of less than about 5 and Broensted acidity of from about 1 to about 20 micromole/g, an amorphous cracking component and a catalytic amount of hydrogenation component selected from the group consisting of a Group VI metal, a Group VIII metal, and mixtures thereof.

10. A process according to claim 9, wherein the ultrastable Y zeolite has a unit cell size less than or equal to 24.26 Å.

11. A process according to claim 9, wherein the ultrastable Y zeolite has a bulk silica to alumina ratio of greater than 50.

12. A process according to claim 9, wherein the catalyst comprises from about 1% to 70% by weight of ultrastable Y zeolite, from about 10% to 80% by weight of amorphous cracking component, and from about 10% to 30% by weight of a binder.

13. A process according to claim 9, wherein the amorphous cracking component is silica-alumina.

14. A process according to claim 12, wherein the binder comprises an inorganic oxide.

15. A process according to claim 9, wherein the Group VIII metal hydrogenation component is selected from the group consisting of nickel, cobalt, platinum, palladium and mixtures thereof and wherein the Group VI metal hydrogenation component is selected from the group consisting of molybdenum, tungsten and mixtures thereof.

16. A process according to claim 15, wherein the hydrogenation component comprises from about 2% to about 8% by weight of nickel and from about 8% to about 30% by weight of tungsten, calculated as metals per 100 parts by weight of total catalyst.

17. A hydrocracking catalyst composition comprising a low acidity, highly dealuminated ultrastable Y zeolite having an Alpha value of less than about 5 and from about 1 to about 20 micromole/g of Broensted acidity measured by FT-IR, an amorphous cracking component and a catalytic amount of hydrogenation component selected from the group consisting of a Group VI metal, a Group VIII metal, and mixtures thereof.

18. A composition according to claim 17, wherein the ultrastable Y zeolite has a unit cell size less than or equal to 24.26 Å.

19. A composition according to claim 17, wherein the ultrastable Y zeolite has a bulk silica to alumina ratio of greater than 50.

20. A composition according to claim 17, wherein the catalyst comprises from about 1% to 70% by weight of ultrastable Y zeolite, from about 10% to 80% by weight of amorphous cracking component, and from about 10% to 30% by weight of a binder.

21. A composition according to claim 20, wherein the amorphous cracking component is silica-alumina.

22. A composition according to claim 20, wherein the binder comprises an inorganic oxide.

23. A composition according to claim 17, wherein the Group VIII metal hydrogenation component is selected from the group consisting of nickel, cobalt, platinum, palladium and mixtures thereof and wherein the Group VI metal hydrogenation component is selected from the group consisting of molybdenum, tungsten and mixtures thereof.

24. A process for producing a lubricating oil base stock which comprises:

(a) contacting a feedstock under hydrocracking conditions with a catalyst comprising a low acidity, highly dealuminated ultrastable Y zeolite having an Alpha value of less than about 5 and Broensted acidity of from about 1 to about 20 micromole/g, an amorphous cracking component and a catalytic amount of hydrogenation component selected from the group consisting of a Group VI metal, a Group VIII metal, and mixtures thereof; and (b) processing the hydrocracked product to provide a lubricating oil base stock.

\* \* \* \* \*